United States Patent [19]

Walters

[11] 4,040,389
[45] Aug. 9, 1977

[54] ANIMAL FEEDING DEVICE

[76] Inventor: James H. Walters, 1219 Carriage Place, Kalamazoo, Mich. 49008

[21] Appl. No.: 612,763

[22] Filed: Sept. 12, 1975

[51] Int. Cl.² ............................................. A01K 5/00
[52] U.S. Cl. .................................. 119/52 R; 222/81
[58] Field of Search ............... 119/52 R, 53, 18, 53.5; 222/81

[56] References Cited

U.S. PATENT DOCUMENTS

| | | | |
|---|---|---|---|
| 1,091,392 | 3/1914 | Schlichtinger | 119/52 R |
| 2,226,880 | 12/1940 | Tramarollo | 222/81 |
| 3,645,234 | 2/1972 | Schroer | 119/18 |
| 3,690,514 | 9/1972 | Wilson | 222/81 |
| 3,831,814 | 8/1974 | Butler | 222/81 |

FOREIGN PATENT DOCUMENTS 360,554  10/1922  Germany ............................. 222/81

Primary Examiner—Jay N. Eskovitz
Attorney, Agent, or Firm—Gordon W. Hueschen

[57] ABSTRACT

An animal feeding device comprising a tray adapted to receive food and make it accessible to an animal, a container holding device adapted to receive a container of animal food, a container opening device to open the container when it is inserted into position in the container holding device and a container of animal food which is uniquely adapted to the container holding device and the container opening device.

8 Claims, 5 Drawing Figures

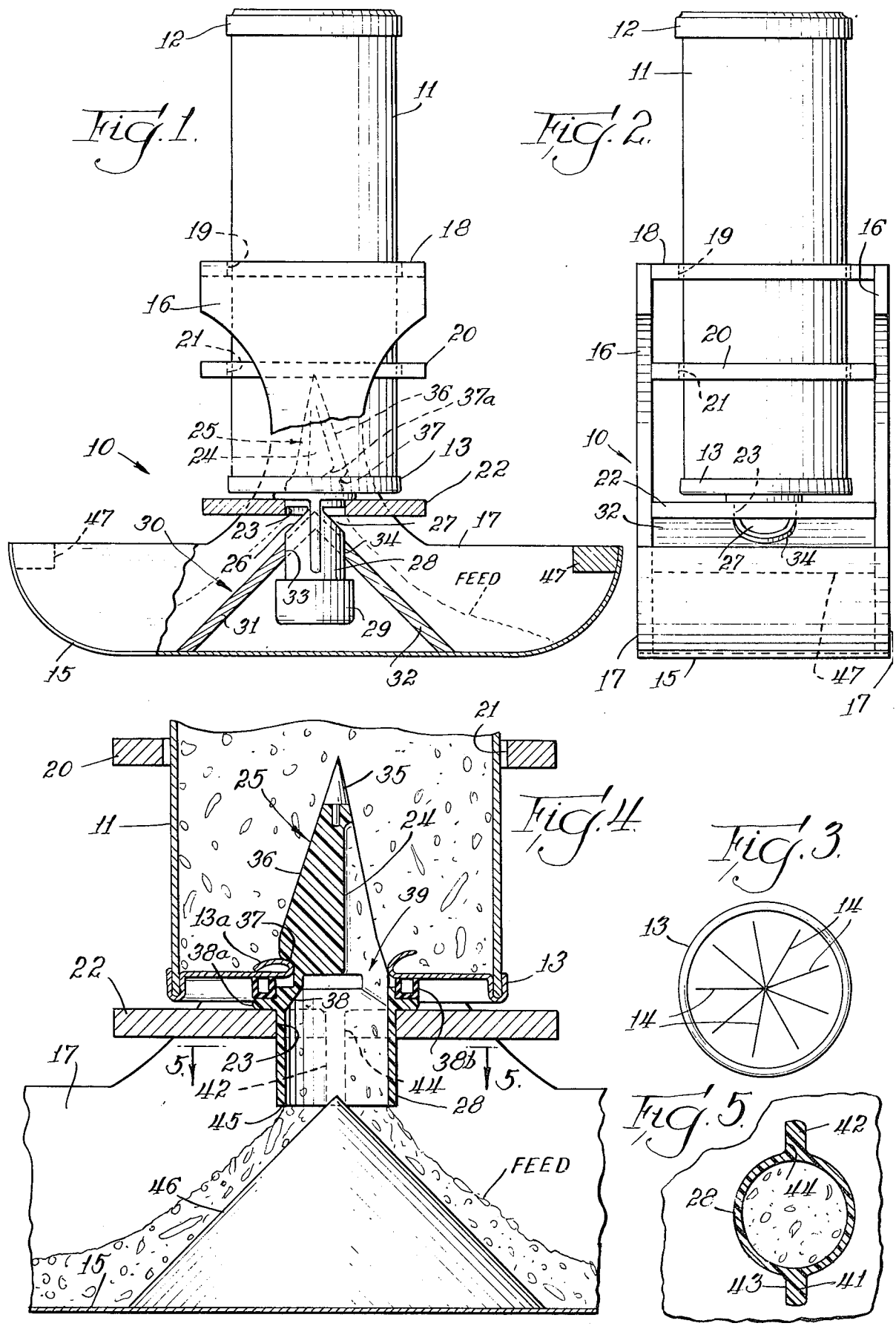

ANIMAL FEEDING DEVICE

BACKGROUND OF THE INVENTION

1. Field of Invention

This invention relates to an animal feeding device, more particularly a bird or pet feeding device, comprising a tray for receiving and making accessible the food, a container holding means, a container of food uniquely adapted for insertion therein, and a means for automatically opening the container when the container is inserted into the container holding means.

2. Prior Art

Various types of animal feeders in which animal feed is discharged from a container or hopper into a tray and there made accessible to the animal are known in the art. Some of these comprise pre-packaged containers having a frangible portion which can be broken open to allow the food to disperse into the tray. In none of these, however, is the animal feeder provided with means for automatically opening the container when it is inserted into its holder, especially one comprising a perforating portion tapering upwardly to a perforating point and a pre-packaged container providing a frangibility which is a unique function of the perforating portion of the means for automatically opening the container and of the container itself. U.S. Pat. No. 3,645,234 shows an animal feeding device having a perforating point adapted to penetrate a perforatable wall of the container when it is placed in the container holding device attached to an animal cage. It is designed to handle liquid food and is not well adapted for handling solid foods because the shape is such that it does not allow access to the discharge portion from all angles, nor does it have a tray for receiving and distributing the food and in other respects is not of the same field of utility as the present invention.

OBJECTS OF THE INVENTION

It is an object of the invention to provide a new and improved animal feeding device. It is a further object of the invention to avoid the disadvantages of the prior art and a still further object of the invention is to obtain such advantages as will appear as the description proceeds.

SUMMARY OF THE INVENTION

This invention relates to an animal feeding device having tray means adapted to receive food and make it accessible to an animal, container holding means above and spaced from the tray means, container perforating means having an upwardly projecting perforating portion tapering upwardly to a perforating point and a downwardly projecting discharge portion. The container perforating means is located in the center bottom portion of the container holding means and the perforating portion has channel means communicating with the discharge portion. When a container having a perforatable wall is inserted into the container holding means with the perforatable wall apposite the container perforating means and is pushed down, the container perforating means will perforate the perforatable wall and bring the channel means into said container so that food from said container can pass through the channel means into the discharge portion and out into the tray means.

The perforating portion of the container perforating means has ribs slanting upwardly to the perforating point, which ribs alternate with channels of the channel means. A collar may be provided at the juncture of the upwardly projecting perforating portion and the downwardly projecting discharge portion of the container perforating means which is adapted to seat against the perforatable wall when the container is pushed all the way down into the container holding means. A gasket may be provided, if desired, as part of the collar in order to effect a firm seal. This is particularly advantageous when the ribs are undercut adjacent the collar so that when the container is rotated relative to the container perforating means, the undercut portions ride up over the bent-back portions of the perforatable or perforated wall of the container to provide a firm engagement of the container therewith. If desired, the leading edge of the ribs, that is, the edge facing the direction of rotation, is cut back to make it easier for the undercut portion to ride up over the bent-back portion of the perforated wall. Advantageously, the ribs are made of a plastic which has a low coefficient of friction.

The tray means may be provided with dispersing means or distributing means which may simply be a wedge-shaped device into the apex of which the discharge portion projects. In this case, apertures are cut on each side of the discharge portion to allow the food to pass out over the sides of the wedge-shaped dispersing or distributing means.

Alternatively, the dispersing or distributing means may be a cone-shaped device in the tray with the apex of the cone located at or near the center of a bottom opening in the discharge portion. In either modification, the discharge portion may be simply a tubular member projecting downwardly from the collar. Where apertures are cut on each side of the discharge portion, the bottom of the tubular member is sealed. Where they are not provided, the bottom of the tubular member is open and disposed over the apex of the dispersing or distributing means.

The container may be of any shape and the container holding means may be shaped to conform therewith. Advantageously, however, the container is cylindrical so that it can be rotated in the container holding means, in which case the container perforating means is fixedly mounted in the bottom of the container holding means so that all one needs to do is to push down the container and rotate it to fix it firmly in place. Alternatively, the container and container holding means may be of other shape so that the container is not rotatable therein. Then the container perforating means is mounted for rotation and suitable means, such as a lever, may be provided for effecting the relative rotation of the container perforating means and the container.

The discharge portion of the container perforating means is so located with reference to the tray means and the dispersing or distributing means therein that when sufficient food has passed through the channel means of the perforating portion into the tray, the buildup of food against the apertures of the discharge portion stops the flow of food into the tray means in accordance with the known hopper effect.

The container, advantageously, is scored on the perforatable wall with radial extending score lines. These score lines are cut into the material of the perforatable wall, which may be metal or plastic or paper or cardboard, with score lines radiating out from the center. The scoring is made so that the center of the scoring will coincide with the perforating point of the perforating portion when the container is put into the container holding means. These score lines facilitate the penetration of the container perforating means into the container and direct the manner in which the perforated portions fold back.

BRIEF DESCRIPTION OF THE DRAWINGS

In the drawings:
FIG. 1 is a side elevation view partially in section.
FIG. 2 is an end view.
FIG. 3 is a bottom view of the food container.
FIG. 4 is a sectional view of a modified form.
FIG. 5 is a horizontal section taken on line 5—5 of FIG. 4.

DETAILED DESCRIPTION OF THE INVENTION

Referring now particularly to FIGS. 1 and 2, 10 represents the animal feeder and 11 the food container. The container 11 is cylindrical and has a top 12 and a bottom 13. The latter is made of perforatable material such as thin sheet metal. The perforatable bottom has radial score lines 14 as shown more particularly at FIG. 3 which radiate from the center and are cut deeply enough into the material of the bottom 13 to facilitate perforation as above described.

The animal feeder, which in the form shown is a bird feeder, has a tray composed of bottom 15 and side walls 17, and in horizontal section is rectangular. It may, however, be circular in horizontal section or of any other desired shape. Mounted on the tray is a container holder having side portions 16 projecting upwardly from the side walls 17 of the tray, an upper support 18 having an aperture 19 therein to receive the seed or food container, an intermediate support member 20 with an aperture 21 therein also to receive the food container, and a bottom or lower support 22. The bottom or lower support 22 has an aperture 23 therein for receiving a perforating means 24.

The perforating means 24 comprises an upper perforating portion 25 and a lower discharge portion 28. At the juncture of the perforating portion 25 and the discharge portion 28, there is a collar 38 which is best seen in FIG. 4. This collar comprises an annular shoulder 38a and an annular gasket 38b resting thereon. The annular gasket has a U-shaped cross section with the bight of the U resting on the annular shoulder 38a as shown in FIG. 4. The perforating portion 25 comprises a plurality of equally spaced ribs, 36, preferably at least 3, tapering up to a perforating point 35. The ribs 36 have channels 39 between them communicating with the interior of the discharge portion 28 so that when the container is in position as shown in FIGS. 1 and 4, the food or seed in the container can pass through the channels 39 into the discharge portion 28 and out into the tray portion.

The ribs 36 are undercut as shown at 37 and the leading edges are cut back as shown at 37a so that, when the container is rotated in a clock-wise direction looking down, the undercut portion 37 with the cut-back portion 37a will ride up over the bent-back portions 13a of the container bottom 13 as shown in FIG. 4 and press the bottom 13 into secure contact with the gasket 38b.

In the modification shown in FIGS. 1 and 2, there is provided a wedge-shaped distributing means 30 having sides 31 and 32 tapering down and outwardly from an apex near the bottom or lower support 22. This distributing means 30 has an aperture 33-34 through which the discharge portion 28 projects. The bottom portion of the discharge portion 28 is closed by the closure 29 and the outer upper portion has cutouts or apertures 26 and 27 just above the sides 31 and 32, respectively, so that the seed or food entering the channels 39 can pass out through the cutouts or apertures 26 and 27 into the tray.

In the modification shown in FIG. 4, the discharge portion 28 is cut off at 45 to provide a bottom opening and the distributing means is a cone 46 having its apex in the axis of the discharge portion 28 and adjacent, preferably slightly in, the aperture 45. If desired, the discharge portion of the perforating means may have flanges or ears 41 and 42 more effectively to hold the perforating means against rotation when the container is rotated relative to the perforating means. These ears or flanges may be held in slots 43 and 44 in the bottom or lower support 22.

Similar slots are provided in the bottom or lower support 22 in FIG. 1 and also in the wedge-shaped distributing means 30, if the wings 41 and 42 are long enough to extend beneath the distributing means 30.

If desired, the tray may have cross supports 47 to provide both a reinforcement and a perch for birds feeding from the tray.

The perforating means may be made of any suitable material such as aluminum or plastic or even steel and capped with a perforating point 35 which advantageously may be made of steel or other hard sharp material. Advantageously, it is made of a plastic having a low coefficient of friction, expecially where the perforatable bottom 13 is made of metal. Nylon, for example, nylon 66, is a suitable such material and the undercut portions 37, 37a ride up easily over the bent-back portions 13a as shown in FIG. 4.

The score lines 14, advantageously, are in multiples of the number of ribs. Thus, as three ribs are used in the modification shown, there are 9 score lines provided on the perforatable wall. Thus, no matter how the score lines are oriented with respect to the ribs, there will always be one close to each rib. Also, there will be a symmetry between the ribs and the score lines which will result in clean cuts and the proper roll back of the cut portions so that the undercut ribs can ride up over them effectively.

It is to be understood that the invention is not to be limited to the exact details of operation or structure shown and described as obvious modifications and equivalents will be apparent to one skilled in the art.

I claim:
1. An animal feeding device for non-liquid feed comprising tray means adapted to receive food and to make it accessible to an animal, container holding means spaced from said tray means, container perforating means having an upwardly projecting perforating portion tapering upwardly to a perforating point and a downwardly projecting discharge portion, said container perforating means being located in the center bottom portion of the container holding means and said perforating portion having channel means communicating from adjacent said perforating point essentially vertically downward to said discharge portion, whereby when a container having a bottom perforatable wall is inserted into said container holding means with the perforatable wall apposed to said perforating means and pushed down, the perforating means will perforate the perforatable wall and bring the channel means into said container, said channel means communicating directly with the portion of the container immediately adjacent said perforatable wall so that food from the bottom of said container can gravitate through said channel means into said discharge portion and out into said tray, and in which disposed beneath the discharge portion is a feed distributing means adapted to cause the food to move toward an accessible portion of the tray means.

2. The animal feeding device of claim 1, in which the distributing means is wedge-shaped and the discharge portion has discharge openings adapted to discharge food out each side of the wedge-shaped distributing means.

3. The animal feeding device of claim 1, in which the discharge portion has a bottom opening and the distributing means is cone shaped with its apex centered beneath said bottom opening.

4. An animal feeding device for non-liquid feed comprising tray means adapted to receive food and to make it accessible to an animal, container holding means spaced from said tray means, container perforating means having an upwardly projecting perforating portion tapering upwardly to a perforating point and a downwardly projecting discharge portion, said container perforating means being located in the center bottom portion of the container holding means and said perforating portion having channel means communicating from adjacent said perforating point essentially vertically downward to said discharge portion, whereby when a container having a bottom perforatable wall is inserted into said container holding means with the perforatable wall apposed to said perforating means and pushed down, the perforating means will perforate the perforatable wall and bring the channel means into said container, said channel means communicating directly with the portion of the container immediately adjacent said perforatable wall so that food from the bottom of said container can gravitate through said channel means into said discharge portion and out into said tray, and in which the container perforating means has a collar at the juncture of the upwardly and downwardly projecting portions adapted to contact the perforated wall when the container is pushed into the container holding means, in which the upwardly projecting perforating portion has ribs alternating with channels and said ribs taper upwardly from said collar to the perforating point, in which the ribs are undercut adjacent the collar whereby, when the container perforating means is rotated relative to the perforated wall, the undercut portions of the ribs ride up over bent-back portions of the perforated wall and thus force the collar into tight engagement therewith, and in which the leading edge of each rib is cut back to facilitate the undercut portions riding up over the bent-back portions of the perforated wall so that said bent-back portions of the perforated wall are pushed and folded down through the animal feed in such manner that flow of feed into the channels and discharge portion of the container perforating means is not obstructed.

5. An animal feeding device for non-liquid feed comprising tray means adapted to receive food and to make it accessible to an animal, container holding means spaced from said tray means, container perforating means having an upwardly projecting perforating portion tapering upwardly to a perforating point and a downwardly projecting discharge portion, said container perforating means being located in the center bottom portion of the container holding means and said perforating portion having channel means communicating from adjacent said perforating point essentially vertically downward to said discharge portion, whereby when a container having a bottom perforatable wall is inserted into said container holding means with the perforatable wall apposed to said perforating means and pushed down, the perforating means will perforate the perforatable wall and bring the channel means into said container, said channel means communicating directly with the portion of the container immediately adjacent said perforatable wall so that food from the bottom of said container can gravitate through said channel means into said discharge portion and out into said tray, and in which the container perforating means has a collar at the juncture of the upwardly and downwardly projecting portions adapted to contact the perforated wall when the container is pushed into the container holding means, in which the upwardly projecting perforating portion has ribs alternating with channels and said ribs taper upwardly from said collar to the perforating point, in which the ribs are undercut adjacent the collar whereby, when the container perforating means is rotated relative to the perforated wall, the undercut portions of the ribs ride up over bent-back portions of the perforated wall and thus force the collar into tight engagement therewith and so that said bent-back portions of the perforated wall are pushed and folded down through the animal feed in such manner that flow of feed into the channels and discharge portion of the container perforating means is not obstructed, and in which the collar comprises a soft resilient gasket seated on a shoulder to provide an effective seal between the container perforating means and the perforated wall, which gasket is adapted to be compressed when said undercut portions of the ribs ride up over the bent-back portions of the perforated wall.

6. The animal feeding device of claim 5, in which the gasket is U-shaped in cross section with the bight of the U seated on the shoulder.

7. An animal feeding device for non-liquid feed comprising tray means adapted to receive food and to make it accessible to an animal, container holding means spaced from said tray means, container perforating means having an upwardly projecting perforating portion tapering upwardly to a perforating point and a downwardly projecting discharge portion, said container perforating means being located in the center bottom portion of the container holding means and said perforating portion having channel means communicating from adjacent said perforating point essentially vertically downward to said discharge portion, whereby when a container having a bottom perforatable wall is inserted into said container holding means with the perforatable wall apposed to said perforating means and pushed down, the perforating means will perforate the perforatable wall and bring the channel means into said container, said channel means communicating directly with the portion of the container immediately adjacent said perforatable wall so that food from the bottom of said container can gravitate through said channel means into said discharge portion and out into said tray, and in which the container perforating means has a collar at the juncture of the upwardly and downwardly projecting portions adapted to contact the perforated wall when the container is pushed into the container holding means, in which the upwardly projecting perforating portion has ribs alternating with channels and said ribs taper upwardly from said collar to the perforating point, in which the ribs are undercut adjacent the collar whereby, when the container perforating means is rotated relative to the perforated wall, the undercut portions of the ribs ride up over bent-back portions of the perforated wall and thus force the collar into tight engagement therewith so that said bent-back portions of the perforated wall are pushed and folded down through the animal feed in such manner that flow of feed into the channels and discharge portion of the container perforating means is not obstructed, and in which the ribs are constructed of plastic material of low coefficient of friction thereby to facilitate the undercut portions of the ribs riding up over the bent-back poritons of the perforated wall.

8. The animal feeding device of claim 7, in which the plastic material is nylon.

* * * * *